United States Patent
Pocovi et al.

(10) Patent No.: US 12,494,891 B2
(45) Date of Patent: Dec. 9, 2025

(54) HANDLING OF CROSS-LINK INTERFERENCE ON PHYSICAL RANDOM ACCESS CHANNEL OCCASIONS ON FLEXIBLE/FULL DUPLEXING SLOTS

(71) Applicant: Nokia Technologies Oy, Espoo (FI)

(72) Inventors: Guillermo Pocovi, Aalborg (DK); Elena Peralta Calvo, Tampere (FI); Claudio Rosa, Randers (DK); Benoist Pierre Sebire, Tokyo (JP); Sheyam Lal Dhomeja, Espoo (FI); Perttu Aukusti Mella, Lepsämä (FI)

(73) Assignee: Nokia Technologies Oy, Espoo (FI)

( * ) Notice: Subject to any disclaimer, the term of this patent is extended or adjusted under 35 U.S.C. 154(b) by 412 days.

(21) Appl. No.: 18/307,502

(22) Filed: Apr. 26, 2023

(65) Prior Publication Data

US 2023/0354437 A1 Nov. 2, 2023

Related U.S. Application Data

(60) Provisional application No. 63/336,075, filed on Apr. 28, 2022.

(51) Int. Cl.
  *H04L 5/14* (2006.01)
  *H04W 74/08* (2009.01)
  (Continued)

(52) U.S. Cl.
  CPC ............ *H04L 5/14* (2013.01); *H04W 74/0833* (2013.01); *H04W 74/0866* (2013.01); *H04W 74/0836* (2024.01); *H04W 74/0838* (2024.01)

(58) Field of Classification Search
  CPC .............................. H04L 5/14; H04W 74/0833
  (Continued)

(56) References Cited

U.S. PATENT DOCUMENTS 11,239,974 B2  2/2022 Li et al.
2018/0270835 A1  9/2018 Chen et al.
(Continued)

FOREIGN PATENT DOCUMENTS

WO  2020/060463 A1  3/2020
WO  2021/138128 A1  7/2021
(Continued)

OTHER PUBLICATIONS

Notice of Allowance received for corresponding European Patent Application No. 23166788.2, dated Feb. 3, 2025, 8 pages.
(Continued)

*Primary Examiner* — Dang T Ton
(74) *Attorney, Agent, or Firm* — Nokia Technologies Oy

(57) ABSTRACT

Systems, methods, apparatuses, and computer program products for improved handling of cross-link interference on physical random access channel occasions on flexible or full duplexing slots are provided. For example, a method can include providing a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The method can also include providing, to the user equipment, one or more parameters configured to steer the user equipment to select between the first set of symbols or slots or the second set of symbols or slots to be used when performing a random access transmission. The method can further include receiving a random access transmission on the selected set of symbols or slots based on one of the plurality of random access channel configurations.

20 Claims, 9 Drawing Sheets

(51) Int. Cl.
*H04W 74/0833* (2024.01)
*H04W 74/0836* (2024.01)
*H04W 74/0838* (2024.01)

(58) Field of Classification Search
USPC .......................... 370/329, 401, 402, 403, 405
See application file for complete search history.

(56) References Cited

U.S. PATENT DOCUMENTS

2021/0100003 A1* 4/2021 Liu ...................... H04W 72/53
2022/0069928 A1 3/2022 Hwang et al.

FOREIGN PATENT DOCUMENTS

| WO | 2021/145996 A1 | 7/2021 |
| WO | 2023/030654 A1 | 3/2023 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NR; Medium Access Control (MAC) protocol specification (Release 16)", 3GPP TS 38.321, V16.7.0, Dec. 2021, pp. 1-158.

"3rd Generation Partnership Project; Technical Specification Group Radio Access Network; NR; Physical layer procedures for control (Release 17)", 3GPP TS 38.213, V17.0.0, Dec. 2021, pp. 1-225.

"New SI: Study on evolution of NR duplex operation", 3GPP TSG RAN#94-e, RP-213591, Agenda Item: 8.6.1, CMCC, Dec. 6-17, 2021, 5 pages.

Ji et al., "Extending 5G TDD Coverage With XDD: Cross Division Duplex", IEEE Access, vol. 9, Mar. 26, 2021, pp. 51380-51392.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.4.0, Dec. 2021, 626 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.4.0, Dec. 2021, pp. 1-187.

"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.

"3rd Generation Partnership Project; Technical Specification Group Radio Access Network; NR; Physical channels and modulation (Release 17)", 3GPP TS 38.211, V17.0.0, Dec. 2021, pp. 1-134.

"Interference management for dynamic TDD and flexible duplex", 3GPP TSG RAN WG1 Meeting #87, R1-1611405, Agenda Item: 7.1.6.2, CATT, Nov. 14-18, 2016, 3 pages.

"Cross-link interference mitigation for flexible duplex", 3GPP TSG RAN WG1 #87, R1-1613221, Agenda Item: 7.1.6.2, Huawei, Nov. 14-18, 2016, pp. 1-3.

Extended European Search Report received for corresponding European Patent Application No. 23166788.2, dated Sep. 19, 2023, 8 pages.

Notice of Allowance received for corresponding European Patent Application No. 23166788.2, dated Jun. 6, 2025, 7 pages.

* cited by examiner

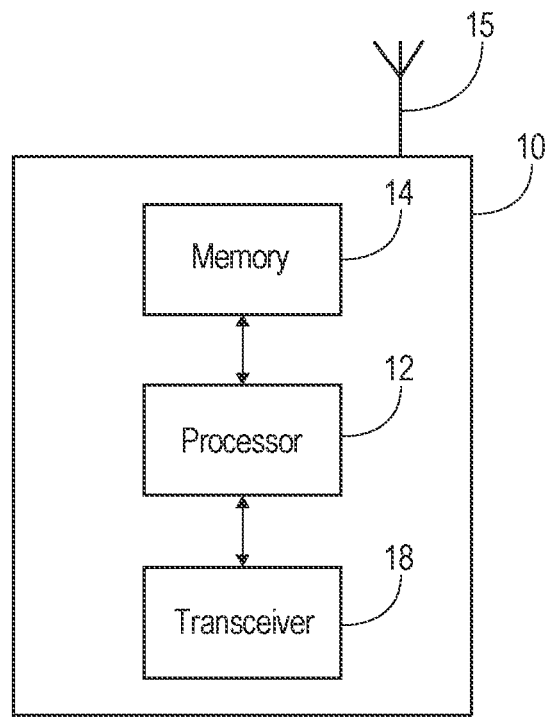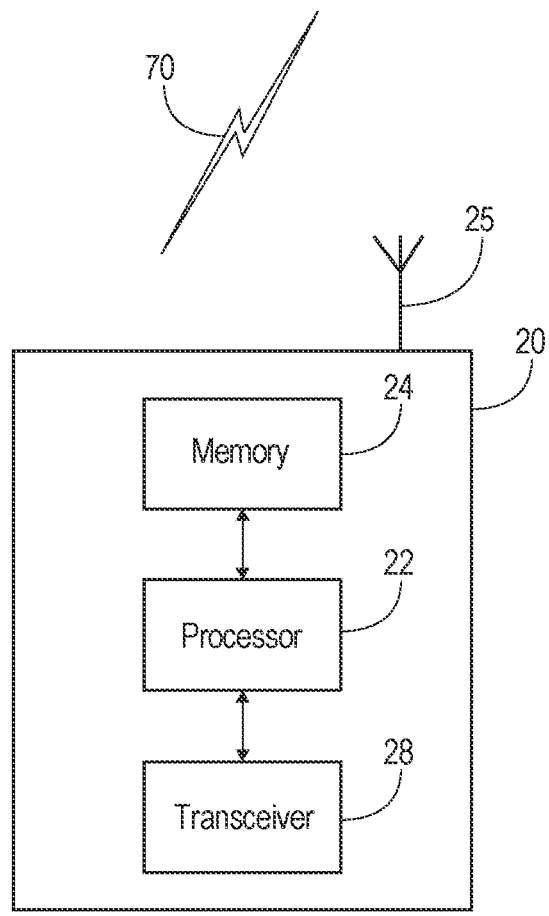
FIG. 11

HANDLING OF CROSS-LINK INTERFERENCE ON PHYSICAL RANDOM ACCESS CHANNEL OCCASIONS ON FLEXIBLE/FULL DUPLEXING SLOTS

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing improved handling of cross-link interference on physical random access channel occasions on flexible or full duplexing slots.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to provide a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The at least one memory and computer program code can also be configured, with the at least one processor, to cause the apparatus at least to provide, to the user equipment, one or more parameters configured to steer the user equipment to select between the first set of symbols or slots or the second set of symbols or slots to be used when performing a random access transmission. The at least one memory and computer program code can further be configured, with the at least one processor, to cause the apparatus at least to receive the random access transmission on the selected set of symbols or slots based on one of the plurality of random access channel configurations.

An embodiment may be directed to an apparatus. The apparatus can include at least one processor and at least one memory comprising computer program code. The at least one memory and computer program code can be configured, with the at least one processor, to cause the apparatus at least to receive a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The at least one memory and computer program code can also be configured, with the at least one processor, to cause the apparatus at least to receive, from the network in the second random access channel configuration, one or more parameters configured to steer the user equipment to select between the first set of symbols or slots or the second set of symbols or slots to be used when performing a random access transmission. The at least one memory and computer program code can further be configured, with the at least one processor, to cause the apparatus at least to perform random access transmission to the network on the selected set of symbols or slots based on one of the plurality of random access channel configurations.

An embodiment may be directed to a method. The method can include providing a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The method can also include providing, to the user equipment, one or more parameters configured to steer the user equipment to select between the first set of symbols or slots or the second set of symbols or slots to be used when performing a random access transmission. The method can further include receiving the random access transmission on the selected set of symbols or slots based on one of the plurality of random access channel configurations.

An embodiment may be directed to a method. The method can include receiving a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The method can also include receiving, from the network in the second random access channel configuration, one or more parameters configured to steer the user equipment to select between the first set of symbols or slots or the second set of symbols or slots to be used when performing a random access transmission. The method can further include performing random access transmission to the network on the selected set of symbols or slots based on one of the plurality of random access channel configurations.

An embodiment may be directed to an apparatus. The apparatus can include means for providing a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The apparatus can also include means for providing, to the user equipment, one or more parameters configured to steer the user equipment to select between the first set of symbols or slots or the second set of symbols or slots to be used when performing a random access transmission. The apparatus can further include means for receiving the random access transmission on the selected set of symbols or slots based on one of the plurality of random access channel configurations.

An embodiment may be directed to an apparatus. The apparatus can include means for receiving a plurality of random access channel configurations to a user equipment. A first random access channel configuration of the plurality of random access channel configurations can be for a first set of symbols or slots and a second random access channel configuration of the plurality of random access channel configurations can be for a second set of symbols or slots. The apparatus can also include means for receiving, from the network in the second random access channel configuration, one or more parameters configured to steer the user equipment to select between the first set of symbols or slots or the second set of symbols or slots to be used when performing a random access transmission. The apparatus can further include means for performing random access transmission to the network on the selected set of symbols or slots based on one of the plurality of random access channel configurations.

BRIEF DESCRIPTION OF THE DRAWINGS

For proper understanding of example embodiments, reference should be made to the accompanying drawings, wherein:

FIG. 11 illustrates an example block diagram of a system, according to an embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing improved handling of cross-link interference on physical random access channel occasions on flexible or full duplexing slots, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to ways of handling inter-user equipment (UE) cross-link interference (CLI) in flexible duplexing (FDU) or full duplex operation focusing on features related to the random access procedure configuration. For a better understanding, the following non-limiting and illustrative discussion describes full/flexible duplexing, cross-link interference (CLI) challenges with flexible duplexing, and random access procedures.

Figure 1:
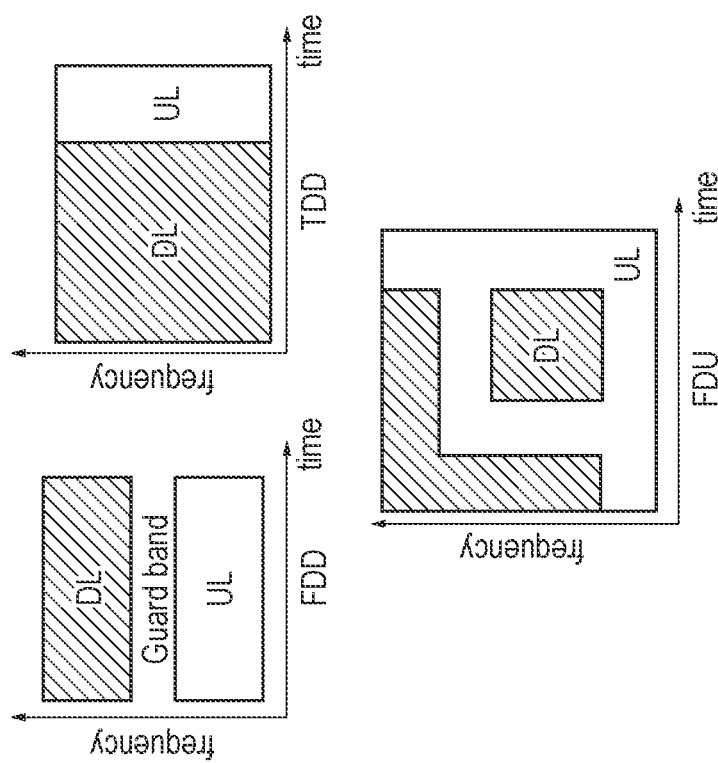
FIG. 1 illustrates frequency-time resource partitioning with flexible duplexing as compared to frequency division duplex and time division duplex.

FIG. 1 illustrates frequency-time resource partitioning with flexible duplexing as compared to frequency division duplex and time division duplex. Certain embodiments relate to the evolution of the third generation partnership project (3GPP) new radio (NR) which currently supports two duplexing modes: frequency division duplex (FDD) for paired bands and time division duplex (TDD) for unpaired bands. In TDD, the time domain resource can be split between downlink and uplink. Allocation of a limited time duration for the uplink in TDD may result in reduced uplink coverage, increased uplink latency and reduced uplink capacity.

Flexible duplexing or full duplex on non-overlapping resources may provide a way to allow simultaneous downlink and uplink transmission on different physical resource blocks (PRBs) within an unpaired wideband NR carrier, as illustrated in FIG. 1. Certain embodiments are also applicable to traditional full duplex operation, where uplink (UL) and downlink (DL) resources may be fully overlapping in time and frequency. What is referred to as flexible duplexing may also be referred to as cross-division duplexing (xDD) or sub-band full duplex (SBFD). Other names and descriptions are also permitted.

Figure 2:
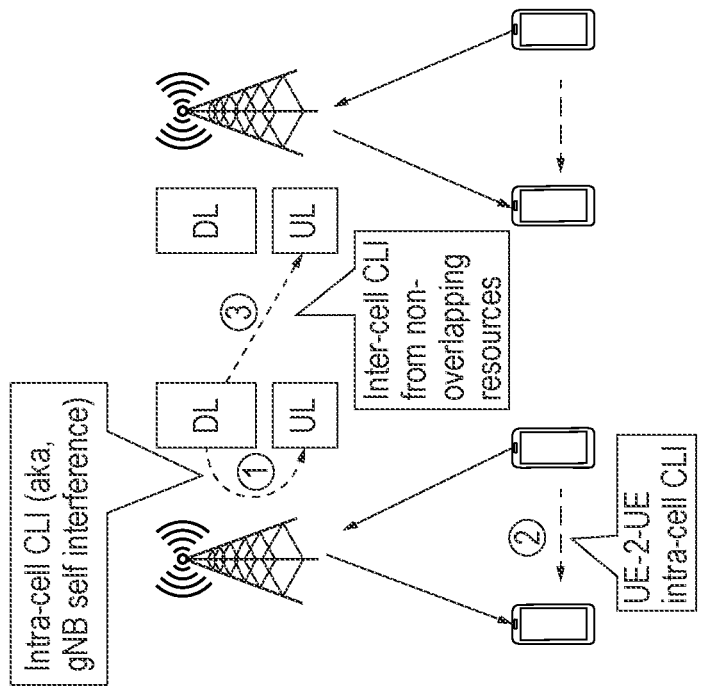
FIG. 2 illustrates examples of cross link interference from non-overlapping resources with subband non-overlapping full duplex.

FIG. 2 illustrates examples of cross link interference from non-overlapping resources with subband non-overlapping full duplex. Even if the DL and UL resources are placed on non-overlapping resources as illustrated in FIG. 1, cross-link interference may still occur at both the UE and next generation node B (gNB) side. This CLI is mainly due to non-ideal UE and gNB radio frequency (RF) frontends and transmit/receive filters, where some of the UE's or gNB's transmit power leaks outside the intended bandwidth towards non-allocated resource blocks. FIG. 2 illustrates three examples of CLI scenarios. Certain embodiments may particularly help to handle the scenario of UE-to-UE CLI, where an aggressor UE transmitting in UL with relatively high power, for example up to 23 dBm depending on the UE power class, may interfere a physically-nearby victim UE, receiving at the same time on non-overlapping resources/ PRBs a DL signal with a relatively weak received power, for example −70 dBm or less.

Figure 3:
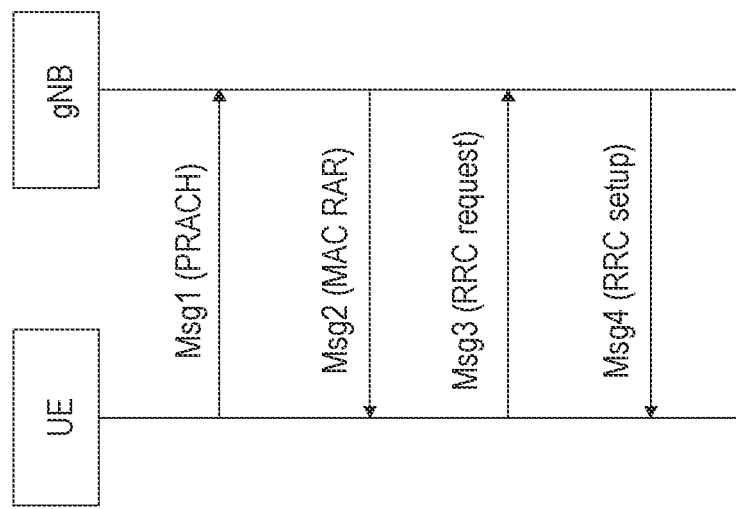
FIG. 3 illustrates four-step contention based random access procedure operation.

FIG. 3 illustrates four-step contention based random access procedure operation. Random access (RA) can refer to a procedure in which the UE synchronizes with the UE's serving cell and obtains initial resources for uplink transmission. This may be used for initial access from radio resource control (RRC) idle state or RRC inactive state.

There are two types of random-access procedures to perform initial access namely contention-free random-access procedure (CFRA) and contention-based random-access procedure (CBRA). In CBRA, the UE randomly selects a preamble from the set of available preambles within the cell, which may end up in collision if more than one UE attempts to perform the initial access using same resources at the same time. Certain embodiments may apply to CFRA and/or CBRA, as well as any other desired random-access procedures.

Random access can involve a four-step procedure, also known as a 4-step random access channel (RACH) procedure, as illustrated in FIG. 3 and specified in 3GPP technical specification (TS) 38.300. For contention-based RA, the four steps may be as follows: in a first step, the UE can first transmit a preamble in what is called message one (Msg1); then the gNB, upon receiving the preamble, can reply using message two (Msg2) to the UE by sending in the physical downlink shared channel (PDSCH) the detected preamble ID, the time-advance command, a temporary cell radio network temporary identifier (TC-RNTI), and an UL grant for the transmission of a third message (Msg3) on the physical uplink shared channel (PUSCH); the UE can respond to Msg2 over the scheduled PUSCH with an ID or contention resolution; and then the gNB can transmit the contention resolution message with the contention-resolution ID in message 4 (Msg4). Upon reception of Msg4, the UE can send an ACK on a PUCCH if the UE's contention-resolution ID is carried by Msg4. This can complete the 4-step RACH.

There is also a 2-step RACH procedure that may provide a lower overall latency of the RACH procedure. This two-step approach can be achieved by the UE first sending a first message (MsgA) containing the equivalent content of Msg1 and Msg3 of the 4-step RACH, followed by the gNB responding with a second message (MsgB) containing the equivalent content of Msg2 and Msg4.

Figure 4:
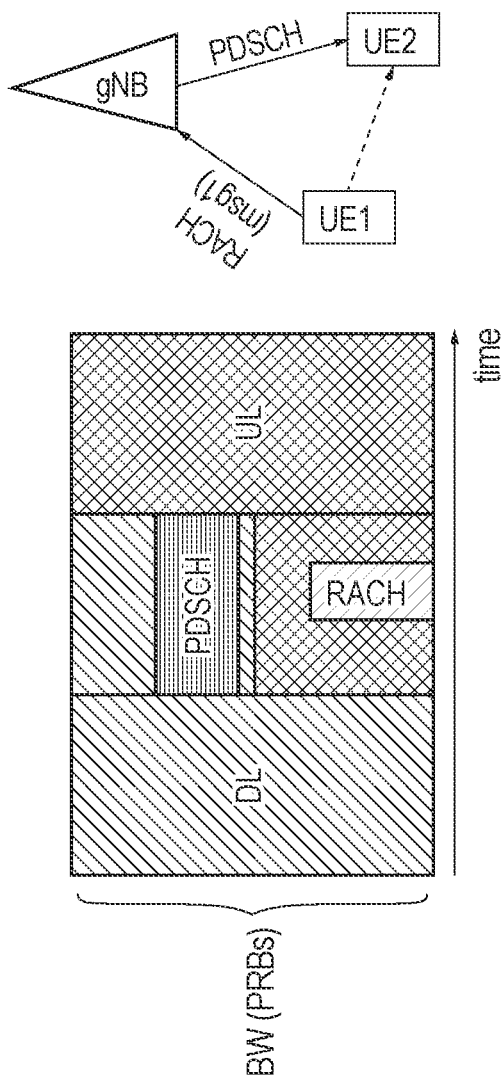
FIG. 4 illustrates an example of a random access channel transmission during a flexible duplexing slot/symbol potentially causing uplink to downlink interference toward a nearby user equipment.

FIG. 4 illustrates an example of a random access channel transmission during a flexible duplexing slot/symbol potentially causing uplink to downlink interference toward a nearby user equipment.

In certain embodiments, for FDU/XDD/SBFD operation there could be a mix of DL-only, UL-only and mixed DL-UL symbols with non-overlapping frequency resources. As mentioned above, certain embodiments may be applicable as well or alternatively to fully overlapping full-duplex operation.

Mixed DL-UL symbols, which may be FDU symbols, may be used in addition to UL-only symbols for RACH opportunities, thereby increasing RACH capacity and reducing initial access delay. As illustrated in FIG. 4, unlike RACH operation in UL-only symbols, RACH in FDU symbols may result in high CLI to other nearby UEs receiving a DL signal, such as a nearby UE receiving DL data scheduled in the PDSCH. Since RACH may be used for initial access, this CLI may be difficult to avoid by gNB scheduling, since the gNB may not be aware in advance as to which UE may transmit on the RACH resources. For connected-mode scheduled UL transmissions on, for example the PUSCH, the gNB may be able to detect that two or more UEs are physically close to each other, for example using CLI sounding reference signal (CLI-SRS) UE-to-UE measurements, and can avoid scheduling these two or more UEs for simultaneous transmission in opposing link directions.

Certain embodiments may help to alleviate and/or avoid the challenges associated with UE-to-UE CLI due to initial random access in XDD/FDU/SBFD slots.

The UE behavior for random access can be based on the settings and values indicated in RACH-ConfigCommon and RACH-ConfigGeneric information elements (IEs) provided via RRC signaling, as specified in 3GPP TS 38.331. The RACH-ConfigGeneric IE may include a prach-ConfigurationIndex parameter corresponding to a row of a table, in 3GPP TS 38.211, which may provide the information to derive the candidate RACH occasions (ROs) in time domain, such as on which specific subframes/slots/symbols of a radio frame (SFN) the UE is allowed to transmit the preamble.

Figure 5:
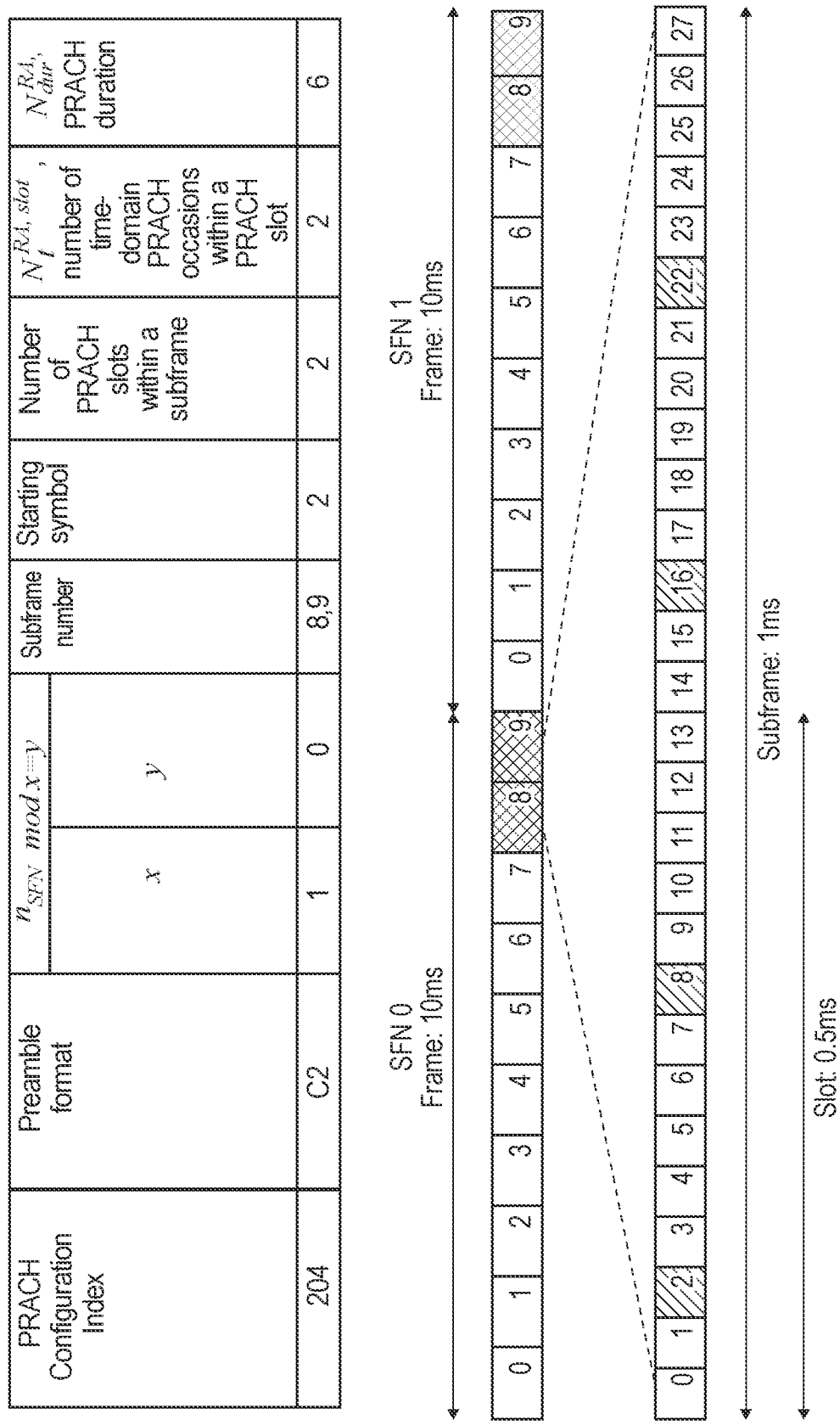
FIG. 5 shows an example of random access occasions.

FIG. 5 shows an example of random access occasions (ROs). More particularly, FIG. 5 illustrates ROs for the case where prach-ConfigurationIndex equals 204, with TDD, random access configurations for frequency range 1 (FR1). Thus, FIG. 5 illustrates an example case to determine the time domain resources of RACH occasions. The first column in the table determines the prach-ConfigurationIndex. The second column in the table determines the preamble format, which corresponds to format C2 in this example. The third column in the table determines the system subframe numbers ($n_{SFN}$) where the RACH occasions are allocated as the $n_{SFN}$ numbers that fulfil the following condition $n_{SFN}$ mod 1=0. The fourth column in the table determines the subframe number within the radio frame where the RACH occasions are allocated, which corresponds to subframes 8th and 9th in this example. The fifth column in the table determines the starting symbol for RACH transmission within the subframe, which corresponds to the second symbol in this example. The sixth column determines the number of RACH slots within a subframe ($N_{slot}^{RA}$), which corresponds to two slots in this example. The seventh column in the table determines the number of RACH occasions within a slot ($N_t^{RA,slot}$) which corresponds to two occasions in this example. The last column in the table determines the duration of a given RACH occasion in terms of OFDM symbols ($N_{dur}^{RA}$), which corresponds to 6 in this example. In this example, the RACH occasions start at the symbols indexes defined as follows: $l=l_0+14N_{slot}^{RA}++N_t^{RA,slot}N_{dur}^{RA}=2+14\times\{0,1\}+\{0,1\}\times6=\{2,8,16,22\}$.

Figure 6:
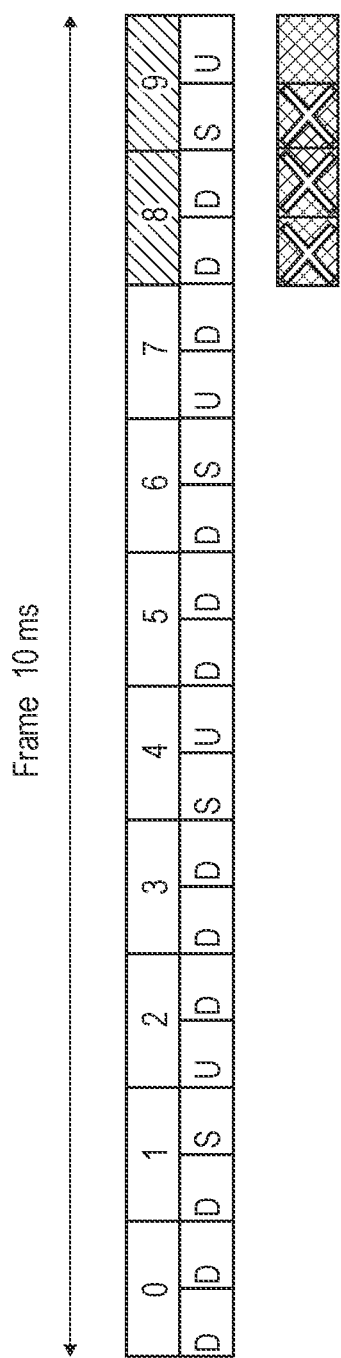
FIG. 6 shows an example of valid random access occasions.

FIG. 6 shows an example of valid random access occasions. After the step of determining the time domain resources of RACH occasions, each RO derived from the table can be determined as valid or not valid if the RO also satisfies the constraints specified in 3GPP TS 38.213, clause 8.1, with respect to the occurrence TDD UL/DL symbols/slots. 3GPP TS 38.213 currently only handles TDD or FDD duplexing modes. Thus, FIG. 6 illustrates an example of valid ROs with prach-ConfigurationIndex 204 and TDD UL/DL configuration DDDSU for UE operation. Different RACH occasions or preambles may be used to implicitly differentiate between non-FDU-aware UEs and FDU-aware UEs. In other words, different types of UEs may be separated into different type-specific resource pools.

The PRACH power control in NR can include various processes. For example, power control can include the following four steps. In a first step, the UE can receive the RACH configuration from the network, for example in RACH-ConfigCommon and RACH-ConfigGeneric. In a second step, the UE can estimate pathloss based on the serving cell reference signal (CRS) in a synchronization signal block (SSB). In a third step, the UE can perform a first transmission attempt of Msg1 with open loop path loss compensation. Then, in a fourth step, the UE can wait for the network feedback, such as a random access response (RAR) in Msg2, and in case no feedback is received, the UE can perform a second transmission attempt of Msg1 after applying a back-off period with a power ramping.

Once a valid RO is determined, the UE can derive the transmit power for the Msg1 transmission based on the configured preambleReceivedTargetPower parameter. Such parameter can be first handled by the medium access control (MAC) layer where, among other things, a preamble-specific power offset DELTA_PRAMBLE can be added, and the resulting received target power can be finally forwarded to the physical layer to be used for the Msg1 transmission. In particular, the UE can determine a transmission power for the PRACH as the minimum of two values defined in 3GPP TS 38.213 clause 7.4: P_prach=min(P_cmax, P_prach_target+PL). Pcmax is the UE configured maximum output power, PL is the pathloss compensation based on the DL RS (SS/PBCH block) associated with the PRACH transmission and calculated by the UE in dB and, P_prach_target is the PRACH target reception power PREAMBLE_RECEIVED_TARGET_POWER provided by higher layers and controlled by the MAC layer. For the 1st transmission attempt, the preamble target power can be defined as follows: P_prach_target=preambleReceivedTargetPower+DELTA_PREAMBLE. For the nth transmission attempt, the power ramping of the PRACH preamble can update the P_prach_target as follows: P_prach_target=preambleReceivedTargetPower+DELTA_PREAMBLE+(PREAMBLE_POWER_RAMPING_COUNTER−1)×powerRampingStep+POWER_OFFSET_2STEP_RA. The powerRampingStep is defined by RRC parameters and the DELTA_PREAMBLE is the power offset that can be obtained by look up tables based on the preamble format derived from the predefined prach-ConfigurationIndex.

In summary, the UE can select the transmit power by compensating for the measured DL pathloss in order to reach the desired target reception power PREAMBLE_RECEIVED_TARGET_POWER at the gNB. If such transmit power is to exceed the maximum UE transmit power P_cmax, for example 23 dBm depending on UE power class, the UE can limit the transmit power to P_cmax.

Certain embodiments may focus on rules for selecting one or another RACH configuration, for example particularly focusing on possible CLI between UEs and load balancing between non-FDU aware UEs and FDU-aware UEs.

Certain embodiments may rely on the availability of RACH occasions, such as ROs, on both UL symbols and flexible duplexing symbols, which may be characterized as UL-DL symbols or FDU or SBFD symbols. Certain embodiments may provide rules/mechanisms for the UE to select one or another pool of RACH resources taking into account potential UE-to-UE cross link interference.

In certain embodiments, the UE may be provided with at least two RACH configurations, which may imply that RACH on FDU symbols/slots is possible. The first configuration can be used for UL slots whereas the second configuration can be used for FDU slots.

Each RACH configuration can have, among other parameters, an associated preamble received target power provided by preambleReceivedTargetPower parameter inside RACH-ConfigGeneric. For load balancing between non-FDU-aware UEs (sometimes also referred to as legacy UEs) and FDU-aware UEs, the FDU-aware UEs may be configured to prioritize Msg1 transmissions on the FDU slots using the second RACH configuration.

The prioritization could also depend on the following characteristics: the quality of service (QoS) flow identifiers QFIs of the data awaiting transmission; the logical channel (LCH) priorities of the data awaiting transmission; the access category of the UE; and/or the RRC procedure and/or the signalling message triggering the lower layer to initiate the random access procedure.

For each of these characteristics, the network can configure a criteria to determine whether a corresponding prioritization condition is fulfilled. For instance, a list of allowed QFI, a minimum LCH priority, a subset of RRC messages, and/or access categories could be configured by the network, either through broadcast signalling or dedicated signalling message. When the prioritization criteria is or are met, PRACH transmission in the FDU slots can be enabled. If a priority indication is not signalled, the UE may freely select between the two RACH configurations, for example whichever comes first.

Depending on whether the current RACH occasion (RO) is an UL slot or an FDU slot, the UE can use corresponding RACH configuration parameters, including a corresponding preambleReceivedTargetPower value among others.

A RACH configuration can be provided with a maximum possible UE output power P_prach_max. This RACH configuration may be the second of two RACH configurations provided to the UE. If the derived UE transmission power from 3GPP TS 38.213, P_prach, exceeds P_prach_max, the UE may not consider the corresponding RACH occasion to be valid. Other alternatives are also discussed below.

Alternatively, a maximum pathloss threshold PL_max to the serving cell may also be provided, which also can be used to limit the maximum UE transmission power in FDU slots. If the DL path loss measured at the UE (PL) is less than PL_max, the UE may be allowed to transmit using the corresponding RACH configuration. Otherwise, ROs of the corresponding RACH configuration may be considered invalid.

In case the Msg1 transmission fails, for example if the UE does not receive a random access response and a RAR timer has expired, certain embodiments provide rules to determine a new RO for Msg1 transmission after accounting for the power ramping up procedure, as described below.

PRACH format configured in FDU slots can be different than the one used in UL slots and optimized for lower power transmission. For example, sub-carrier spacing (SCS) can be increased in a PRACH format used in FDU slots to have wider bandwidth for PRACH burst and thus lower maximum power, which may result in lower adjacent channel leakage power ratio (ACLR).

With certain embodiments, the gNB implementation may be as follows. To avoid CLI, conservative P_prach_max or PL_max can be provided for RACH configuration associated to FDU slots, for example to limit the UE transmission power to only 20 dBm or less, even if the UE can support up to 23 dBm. Such conservative values may be particularly applicable to the second RACH configuration. If the UE is in the cell-edge, the UE can then fall back to the UL RACH occasions where the maximum transmit power is not further restricted. The UE may fall back to the first RACH configuration.

Figure 7:
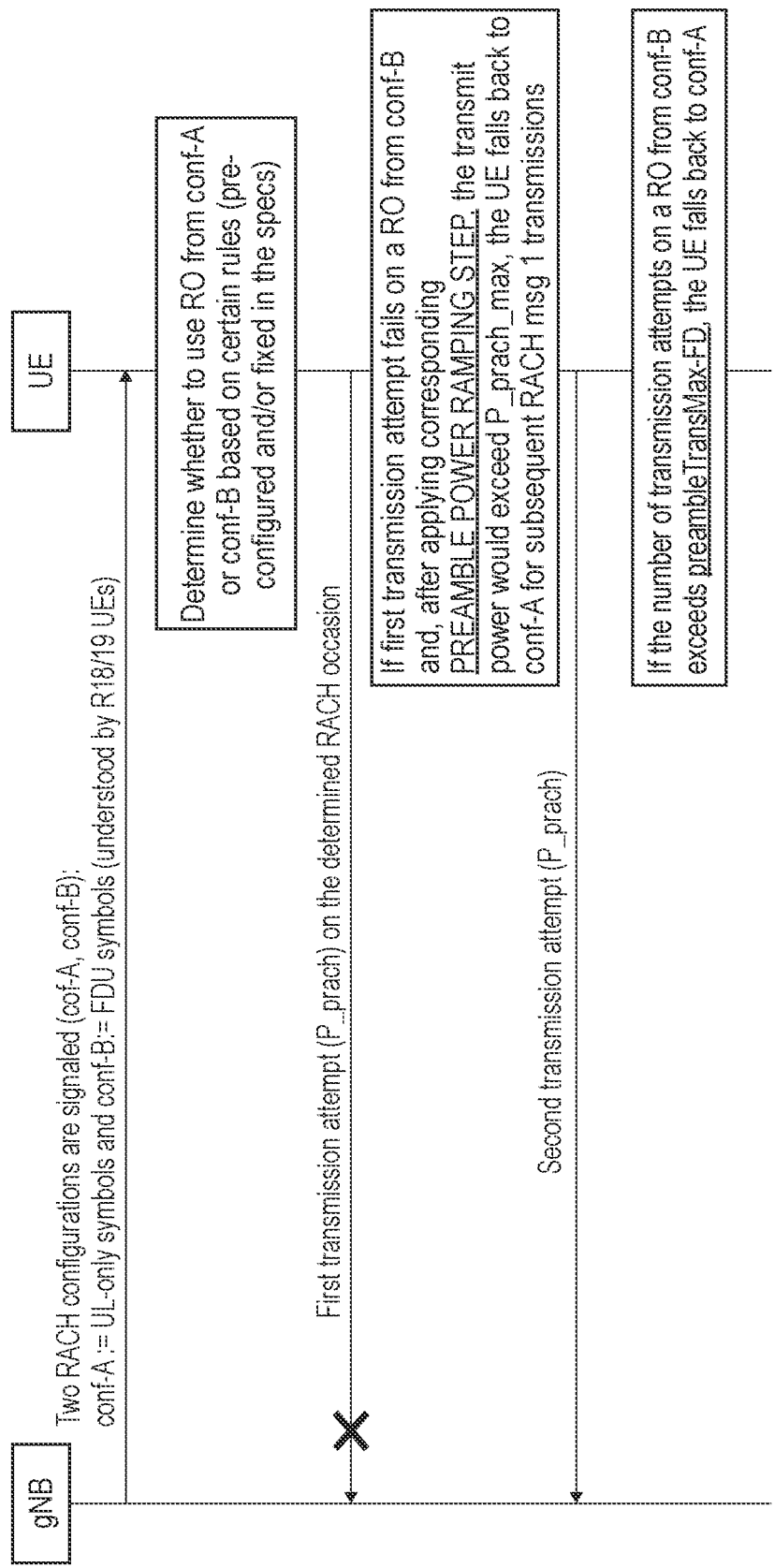
FIG. 7 illustrates a signaling diagram of operations according to certain embodiments.

FIG. 7 illustrates a signaling diagram of operations according to certain embodiments. More specifically, FIG. 7 illustrates operations and a UE-gNB signaling diagram. As shown in FIG. 7, first, the UE may be provided with two RACH configurations via RRC signaling. This may be achieved by providing a second RACH-ConfigGeneric IE as part of RACH-ConfigCommon. This information may be broadcast to all the UEs in the cell via a system information block one (SIB1) message in case of standalone (SA) or through RRCConnectionReconfiguration to UE to perform NR RACH in non-standalone (NSA).

In one alternative, when two RACH configurations are provided, in SIB1 message for SA or RRCConnectionReconfiguration for NSA, the UE can interpret that the first configuration provided is associated to ROs on UL slots/symbols whereas the second configuration is associated to ROs on FDU slots/symbols, or vice versa. In another alternative, the second RACH configuration may be explicitly associated to FDU slots/symbols, for example via a new IE type or new parameter inside the second RACH-ConfigGeneric. This alternative may ease the handling of legacy UEs.

A RACH configuration, for example the second configuration associated with FDU resources, may include one or more parameters to steer the UE to select one or another RO. These parameters may include an indication to the FDU-aware UEs, which can detect the second RACH configuration, to prioritize PRACH/Msg1 transmissions on the FDU slots using the second RACH configuration (prioritizeFD). This prioritization could also be configured depending on the QFI(s) of the data awaiting transmission; the LCH priority(ies) of the data awaiting transmission; the access category of the UE; and/or the RRC procedure and/or message triggering the lower layer to initiate the random access procedure.

These parameters may also or alternatively include a maximum possible UE output power P_prach_max for Msg1 transmission. These parameters may further or alternatively include a pathloss threshold PL_max for the Msg1 transmission.

Figure 8:
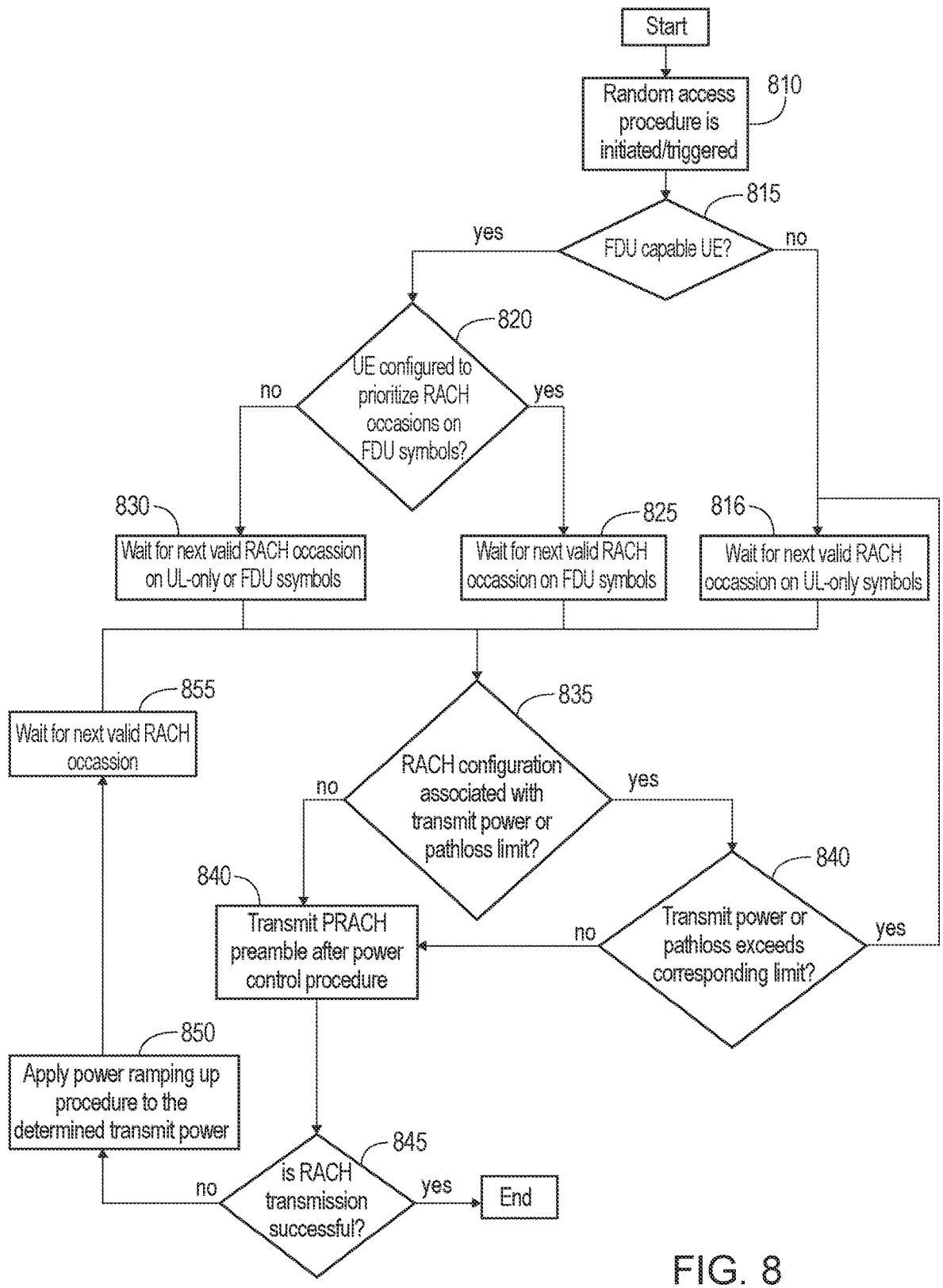
FIG. 8 illustrates a flowchart of user equipment operation, according to certain embodiments.
Figure 9:
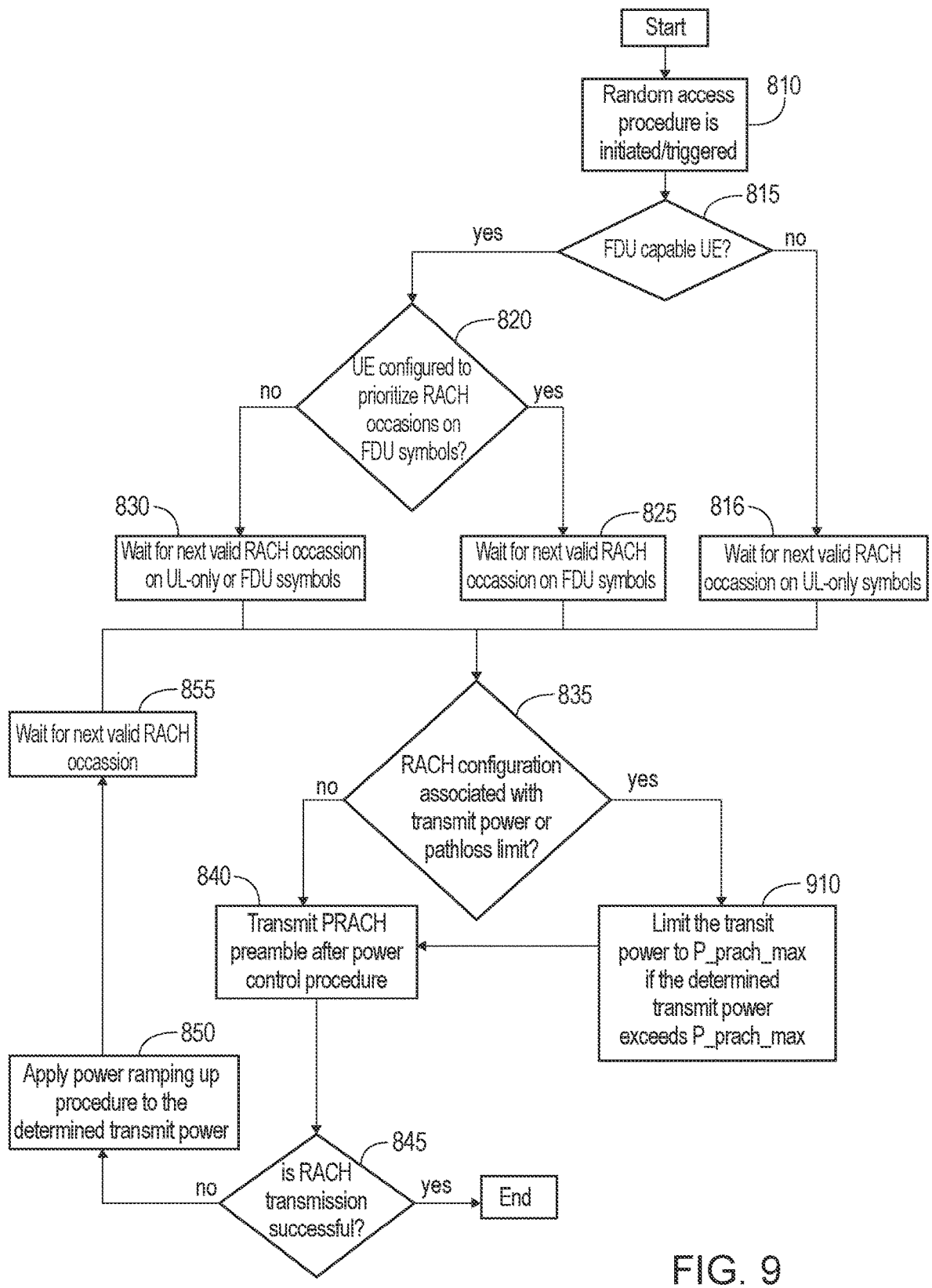
FIG. 9 illustrates another flowchart of user equipment operation, according to certain embodiments.

FIG. 8 illustrates a flowchart of user equipment operation, according to certain embodiments. This flowchart may relate to UE operation according to an option that may be identified as Opt 1-1 for ease of reference only, and not by way of limitation, preference, or priority. FIG. 9 illustrates another flowchart of user equipment operation, according to certain embodiments. This flowchart may relate to UE operation according to an option that may be identified as Opt 1-2 for ease of reference only, and not by way of limitation, preference, or priority.

Based on the received configuration, once a random access procedure is triggered at the UE at 810, the FDU-aware UE, yes path of 815, can proceed to determine a RO for Msg1 transmission as described below and illustrated in FIGS. 8 and 9. Meanwhile non-FDU-aware UE can simply wait for a next valid RACH occasion on UL-only symbols at 816.

If prioritizeFD indication is provided, or enabled in case prioritization criteria are configured (the yes path of 820), the UE can select a candidate RO belonging to the second RACH configuration associated to FDU symbols/slots at 825. Otherwise, at 830, the UE may freely select a RO from the legacy RO pool or FDU pool, for example whichever happens to come first.

Alternatively, it may be fixed in communication specifications that an FDU-aware UE shall always prioritize RO belonging to the RACH configuration associated to FDU symbols/slots. For this case, an explicit prioritizeFD indication may not be needed.

For RACH occasions that belong to the second RACH configuration, some additional considerations may be applied to determine whether the RO is valid or not, for example using rules like or different from those for handling DL/UL/Flexible symbols in traditional TDD operation, as described in FIG. 6.

If P_prach_max parameter is associated to the selected candidate RO, the yes path from 835, Then the UE can proceed to determine the transmit power for Msg1 transmission via existing procedures. If the determined transmit power exceeds P_prach_max (yes path of 840), then according to opt1-1 in FIG. 8, the UE may not consider that RO as valid and may proceed to select a RO from the legacy (first) RACH configuration. Otherwise, according to opt-1-2 in FIG. 9, at 910 the UE may limit the transmit power for Msg1 transmission to P_prach_max.

Either opt1-1 or opt1-2 may be included in communication specifications.

Another option can include allowing the UE to select between opt1-1 or opt1-2 depending on the difference between the nominal transmit power after the power control formula and P_prach_max. I.e., if the difference is higher than a certain threshold, the transmission is dropped (opt 1-1). Otherwise, the UE limits the transmit power to P_prach_max (opt 1-2). In this case, the threshold may be signaled to the UE.

Alternatively or in addition, if PL_max is provided and if the pathloss towards the serving cell exceeds PL_max, the UE may not consider the corresponding RO as valid and may proceed to select a RO from the legacy (first) RACH configuration.

Note that P_prach_max and PL_max may be two ways to limit the UE's transmission power.

Assuming that the limits are not exceeded at 840 in FIG. 8 or the limit is applied at 910 in FIG. 9, then at 845, the UE may transmit PRACH preamble after a power control procedure. In the case of successful transmission (yes path from 845), the process may end.

Otherwise, if the Msg1 transmission fails, for example the UE does not receive a random access response and a RAR timer has expired, at 850 the UE can perform power ramping up procedure and proceeds to determine a new RO for Msg1 transmission and to wait for the next valid RACH occasion at 855.

If the UE is configured to prioritize ROs occasions on FDU slots, for example using the second RACH configuration, and the UE has not fallen back to a legacy RO in UL only symbols, then at 855 the UE waits for a valid RO on FDU resources/symbols as 825; otherwise, the UE waits for any valid RO, on either UL-only or FDU symbols as at 830.

If P_prach_max is configured for the second RACH configuration and if, after applying PREAMBLE_POWER_RAMPING_STEP, the UE transmit power exceeds P_prach_max on a RO from the second RACH configuration, then the UE may delay the transmission of the PRACH preamble to the next RO in which P_prach_max is not applicable. For example, the UE may delay to a next RO from the legacy RO pool, for example the RO pool corresponding to the first RACH configuration.

An additional rule may be also specified to switch to the legacy RO pool if the number of Msg1 transmission attempts on a RO from the second RACH configuration exceeds a configured value preambleTransMax-FD.

In certain embodiments, instead of signaling P_prach_max, the gNB may signal the additional maximum power reduction allowed for PRACH transmissions in FDU slots/symbols (A-MPRFDU) to achieve more stringent emission requirements. In this case, instead of determining the validity of the RO by comparing the transmission power according to the PRACH power control formula with P_prach_max, the UE may determine the validity of the RO occasion depending on whether its transmission power after the PC formula, including power ramping up when applicable, is below/above Pmax−A-MPRFDU.

In yet further embodiments, the gNB may only signal the emission requirements, and the UE may determine the validity of the RO occasion depending on whether it can satisfy the signaled emission requirements with the transmission power according to the PRACH power control formula.

Figure 10:
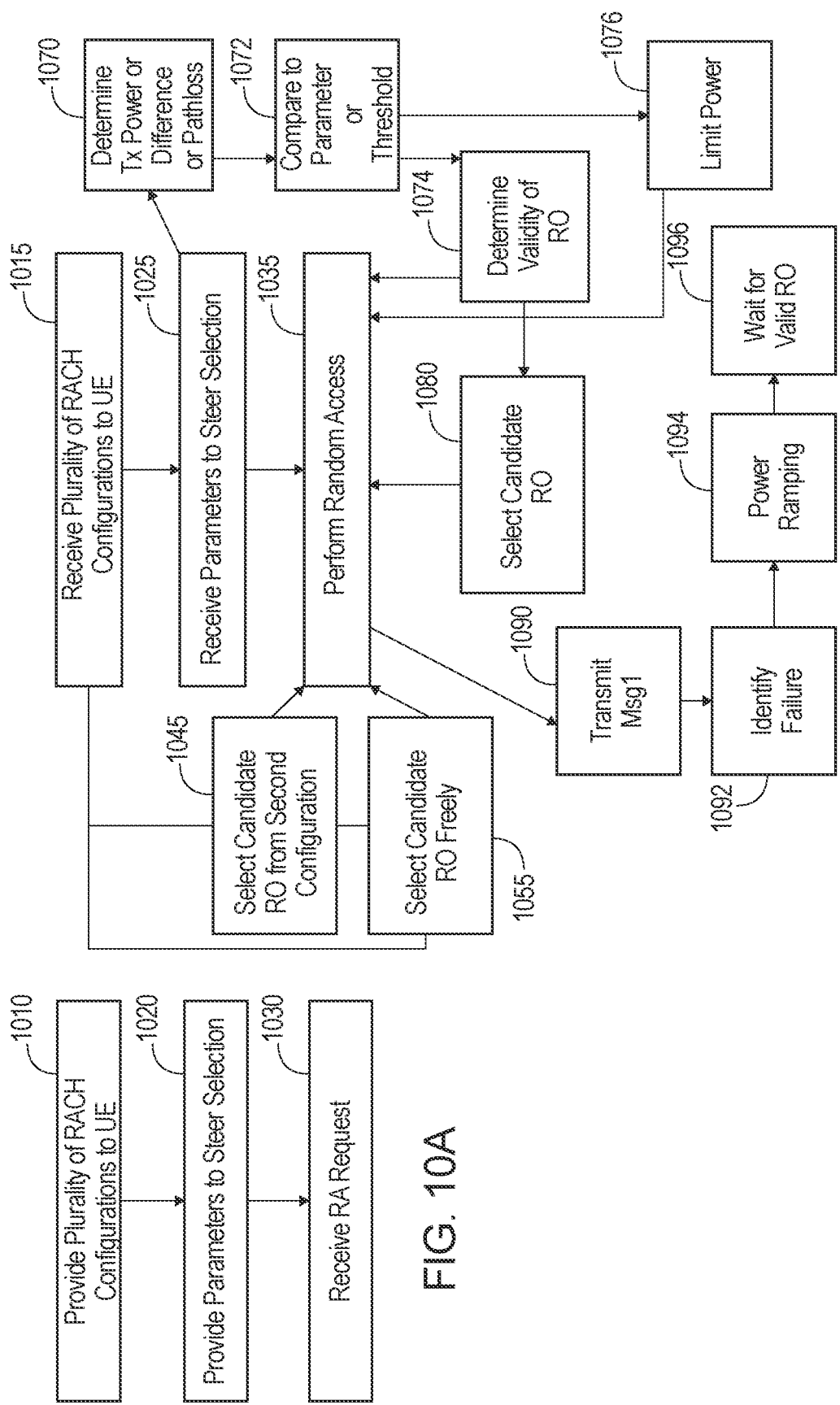
FIG. 10A illustrates an example flow diagram of a method, according to an embodiment.
FIG. 10B illustrates an example flow diagram of a method, according to an embodiment.

FIG. 10A illustrates an example flow diagram of a method for providing improved handling of cross-link interference on physical random access channel occasions on flexible or full duplexing slots, according to certain embodiments.

The method can include, at 1010, providing a plurality of random access channel configurations to a user equipment. A first random access channel configuration of the plurality of random access channel configurations can be for uplink slots and a second random access channel configuration of the plurality of random access channel configurations can be for flexible duplexing slots. More generally, the first random access channel configuration of the plurality of random access channel configurations can be for a first set of symbols or slots and a second random access channel configuration of the plurality of random access channel configurations can be for a second set of symbols or slots.

The method can also include, at 1020, providing, to the user equipment, one or more parameters configured to steer the user equipment to select one or another random access occasion. For example, the one or more parameters may be configured to steer the UE to select one or another set of symbols where the UE is to perform random access transmission. The method can further include, at 1030, receiving a random access request based on one of the plurality of random access channel configurations. The one or more parameters can be provided in the second random access channel configuration.

An association between the second random access channel configuration and flexible duplexing can be indicated by order in a message, or by an explicit indicator. The one or more parameters can include one or more of an indication to prioritize physical random access channel transmissions on the flexible duplexing slots using the second random access channel configuration, a maximum user equipment output power for message one transmission, a maximum user equipment output power for message A transmission, a pathloss threshold for the message one transmission, or a pathloss threshold for the message A transmission. Any combination of the parameters can be included.

It is noted that FIG. 10A is provided as one example embodiment of a method or process. However, certain embodiments are not limited to this example, and further examples are possible as discussed elsewhere herein.

FIG. 10B illustrates an example flow diagram of a method for providing improved handling of cross-link interference on physical random access channel occasions on flexible or full duplexing slots, according to certain embodiments. The method of FIG. 10B can be used alone or in combination with the method of FIG. 10A.

The method can include, at 1015, receiving a plurality of random access channel configurations at a user equipment from a network. A first random access channel configuration of the plurality of random access channel configurations can be for uplink slots and a second random access channel configuration of the plurality of random access channel configurations can be for flexible duplexing slots. More generally, as mentioned above, the first random access channel configuration of the plurality of random access channel configurations can be for a first set of symbols or slots and a second random access channel configuration of the plurality of random access channel configurations can be for a second set of symbols or slots.

The method can also include, at 1025, receiving, from the network, one or more parameters configured to steer the user equipment to select one or another random access occasion. The one or more parameters can be received in the second random access channel configuration The method can further include, at 1035, performing random access to the network based on one of the plurality of random access channel configurations.

An association between the second random access channel configuration and flexible duplexing can be indicated by order in a message, or by an explicit indicator. The one or more parameters can include one or more of an indication to prioritize physical random access channel transmissions on the flexible duplexing slots using the second random access channel configuration, a maximum user equipment output power for message one transmission, or a pathloss threshold for the message one transmission. Any combination of the parameters can be included.

The method can additionally include, at 1045, selecting, for the message one transmission, a candidate random access occasion belonging to the second random access channel configuration according to the indication when the indication is provided. The method can further include, at 1055, selecting, for the message one transmission, a candidate random access occasion freely when the indication is not provided.

The method can additionally include, at 1045, selecting, for the message one transmission, a candidate random access occasion belonging to the second random access channel configuration.

The method can also include, at 1070, determining a transmit power of the random access transmission for the message one transmission for a given random access occasion. The method can further include, at 1072, comparing the determined transmit power of the random access transmission to the maximum user equipment output power for message one transmission.

The method can also include, at 1074, determining validity of the random access occasion based on the comparison.

The method can further include, at 1076, limiting the transmit power of the random access transmission based on the comparison.

The method can also include, at 1070, determining a difference between the determined transmit power of the random access transmission to the maximum user equipment output power. The method can further include, at 1072, comparing the difference to a threshold. The method can also include, at 1074 or 1076, determining validity of the random access occasion or limiting the transmit power of the random access transmission based on the comparison of the difference to the threshold.

The method can further include, at 1070, determining a pathloss. The method can additionally include, at 1072, comparing the determined pathloss to the pathloss threshold for message one transmission. The method can also include, at 1080, selecting a random access occasion from the first random access channel configuration when it is determined that the pathloss threshold is exceeded.

The method can also include, at 1090, transmitting a first message one transmission. The method can further include, at 1092, determining that the first message one transmission failed. The method can additionally include, at 1094, performing a power ramping up procedure based on the determination that the first message one transmission failed. The method can also include, at 1096, waiting for a valid random access occasion on flexible duplexing resources/symbols, a random access occasion from the first random access channel configuration, or any valid random access occasion, in dependence on one or more of an indication to prioritize physical random access channel transmissions on the flexible duplexing slots using the second random access channel configuration, a maximum user equipment output power for message one transmission, or a pathloss threshold for the message one transmission.

It is noted that FIG. 10B is provided as one example embodiment of a method or process. However, certain embodiments are not limited to this example, and further examples are possible as discussed elsewhere herein.

FIG. 11 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 11.

As illustrated in the example of FIG. 11, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 11, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 3-6, or any other method described herein. In some embodiments, as discussed herein, apparatus 10 may be configured to perform a procedure relating to providing improved handling of cross-link interference on physical random access channel occasions on flexible or full duplexing slots, for example.

FIG. 11 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 11.

As illustrated in the example of FIG. 11, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 3-6, or any other method described herein. For example, in an embodiment, apparatus 20 may be controlled to perform a process relating to providing improved handling of cross-link interference on physical random access channel occasions on flexible or full duplexing slots, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may help to alleviate and/or avoid the challenges associated with UE-to-UE CLI due to initial random access in SBFD/XDD/FDU slots. For example, certain embodiments may permit suitable power control to be implemented, thereby limiting unnecessarily powerful Msg1 transmission in FDU slots, or the like, thereby reducing UL-to-DL interference issues.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chip set, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

CLI Cross link interference
DL Downlink
FDD Frequency division duplex
FDU Flexible duplexing
FR Frequency range
NSA Non StandAlone
PDSCH Physical downlink shared channel
PUCCH Physical uplink control channel
PUSCH Physical uplink shared channel
PRACH Physical random access channel
PRB Physical resource block
RA Random access
RACH Random access channel
RAR Random access response
RNTI Radio network temporary identifier
RO RACH Occasion
SA StandAlone
SBFD Sub-band full duplex
SFN System frame number
SSB Synchronization signal block
SRS Sounding reference signal
TDD Time division duplex
UE User Equipment
UL Uplink
xDD Cross-division duplexing scheme

We claim:

1. An apparatus, comprising:
at least one processor; and
at least one memory including computer program code,
wherein the at least one memory and the computer program code are configured to, with the at least one processor, cause the apparatus at least to
provide a plurality of random access channel configurations to a user equipment, wherein a first random access channel configuration of the plurality of random access channel configurations is for a first set of symbols or slots and wherein a second random access channel configuration of the plurality of random access channel configurations is for a second set of symbols or slots;
provide, to the user equipment, one or more parameters configured to steer the user equipment to select between the first set of symbols or slots or the second set of symbols or slots to be used when performing a random access transmission; and
receive the random access transmission on the selected set of symbols or slots based on one of the plurality of random access channel configurations.

2. The apparatus of claim 1, wherein the first set of symbols or slots comprises a set of uplink symbols or slots and the second set of symbols or slots comprises a set of flexible duplexing symbols or slots.

3. The apparatus of claim 2, wherein an association between the second random access channel configuration and flexible duplexing is indicated by order in a message, or by an explicit indicator.

4. The apparatus of claim 2, wherein the one or more parameters comprise one or more of an indication to prioritize physical random access channel transmissions on the flexible duplexing slots using the second random access channel configuration, a maximum user equipment output power for message one transmission, a maximum user equipment output power for message A transmission, a pathloss threshold for the message one transmission, or a pathloss threshold for the message A transmission.

5. The apparatus of claim 1, wherein the one or more parameters are provided in the second random access channel configuration.

6. An apparatus, comprising:
at least one processor; and
at least one memory including computer program code,
wherein the at least one memory and the computer program code are configured to, with the at least one processor, cause the apparatus at least to
receive a plurality of random access channel configurations to a user equipment, wherein a first random access channel configuration of the plurality of random access channel configurations is for a first set of symbols or slots and wherein a second random access channel configuration of the plurality of random access channel configurations is for a second set of symbols or slots;

receive, from the network in the second random access channel configuration, one or more parameters configured to steer the user equipment to select between the first set of symbols or slots or the second set of symbols or slots to be used when performing a random access transmission; and perform random access transmission to the network on the selected set of symbols or slots based on one of the plurality of random access channel configurations.

7. The apparatus of claim 6, wherein the first set of symbols or slots comprises a set of uplink symbols or slots and the second set of symbols or slots comprises a set of flexible duplexing symbols or slots.

8. The apparatus of claim 7, wherein an association between the second random access channel configuration and flexible duplexing is indicated by order in a message, or by an explicit indicator.

9. The apparatus of claim 7, wherein the one or more parameters comprise one or more of an indication to prioritize physical random access channel transmissions on the flexible duplexing slots using the second random access channel configuration, a maximum user equipment output power for message one transmission, a maximum user equipment output power for message A transmission, a pathloss threshold for the message one transmission, or a pathloss threshold for the message A transmission.

10. The apparatus of claim 9, wherein the at least one memory and the computer program code are configured to, with the at least one processor, cause the apparatus at least to select, for the random access transmission, a candidate random access occasion belonging to the second random access channel configuration according to the indication when the indication is provided; and select, for the random access transmission, a candidate random access occasion freely between the two random access channel configurations when the indication is not provided.

11. The apparatus of claim 9, wherein the at least one memory and the computer program code are configured to, with the at least one processor, cause the apparatus at least to determine a transmit power for the random access transmission for a given random access occasion; and compare the determined transmit power to the maximum user equipment output power for random access transmission.

12. The apparatus of claim 9, wherein the at least one memory and the computer program code are configured to, with the at least one processor, cause the apparatus at least to determine a pathloss to a serving cell of the network;

compare the determined pathloss to the pathloss threshold for random access transmission; and select a random access occasion from the first random access channel configuration when it is determined that the pathloss threshold is exceeded.

13. The apparatus of claim 9, wherein the at least one memory and the computer program code are configured to, with the at least one processor, cause the apparatus at least to transmit a first random access transmission;

determine that no response to the first random access transmission was received within a predetermined time limit;

perform a power ramping up procedure based on the determination that no response was received; and determine a valid random access occasion from the second random access channel configuration, a random access occasion from the first random access channel configuration, or any valid random access occasion, in dependence on one or more of an indication to prioritize physical random access channel transmissions on the flexible duplexing slots using the second random access channel configuration, a maximum user equipment output power for random access transmission in the second random access channel configuration, or a pathloss threshold for the random access transmission in the second random access channel configuration.

14. The apparatus of claim 6, wherein the at least one memory and the computer program code are configured to, with the at least one processor, cause the apparatus at least to select, for the random access transmission, a candidate random access occasion belonging to the second random access channel configuration.

15. The apparatus of claim 6, wherein the one or more parameters are provided in the second random access channel configuration.

16. A method, comprising:

receiving a plurality of random access channel configurations to a user equipment, wherein a first random access channel configuration of the plurality of random access channel configurations is for a first set of symbols or slots and wherein a second random access channel configuration of the plurality of random access channel configurations is for a second set of symbols or slots;

receiving, from the network in the second random access channel configuration, one or more parameters configured to steer the user equipment to select between the first set of symbols or slots or the second set of symbols or slots to be used when performing a random access transmission; and performing random access transmission to the network on the selected set of symbols or slots based on one of the plurality of random access channel configurations.

17. The method of claim 16, wherein the first set of symbols or slots comprises a set of uplink symbols or slots and the second set of symbols or slots comprises a set of flexible duplexing symbols or slots.

18. The method of claim 17, wherein an association between the second random access channel configuration and flexible duplexing is indicated by order in a message, or by an explicit indicator.

19. The method of claim 17, wherein the one or more parameters comprise one or more of an indication to prioritize physical random access channel transmissions on the flexible duplexing slots using the second random access channel configuration, a maximum user equipment output power for message one transmission, a maximum user equipment output power for message A transmission, a pathloss threshold for the message one transmission, or a pathloss threshold for the message A transmission.

20. The method of claim 16, further comprising:

selecting, for the random access transmission, a candidate random access occasion belonging to the second random access channel configuration.

* * * * *